(12) United States Patent
Mohanlal et al.

(10) Patent No.: US 10,360,244 B2
(45) Date of Patent: Jul. 23, 2019

(54) SYSTEM AND METHOD FOR IMPROVING COMPUTATIONAL EFFICIENCY OF CONSUMER DATABASES USING HOUSEHOLD LINKS

(71) Applicant: LiveRamp, Inc., San Francisco, CA (US)

(72) Inventors: Amresh Mohanlal, Conway, AR (US); W. Dwayne Collins, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 256 days.

(21) Appl. No.: 15/275,629

(22) Filed: Sep. 26, 2016

(65) Prior Publication Data

US 2017/0091310 A1    Mar. 30, 2017

Related U.S. Application Data

(60) Provisional application No. 62/222,994, filed on Sep. 24, 2015.

(51) Int. Cl.
*G06F 16/28* (2019.01)
*G06Q 30/02* (2012.01)

(52) U.S. Cl.
CPC ....... *G06F 16/287* (2019.01); *G06Q 30/0201* (2013.01)

(58) Field of Classification Search
CPC ............... G06F 17/30601; G06Q 30/0201
See application file for complete search history.

(56) References Cited

U.S. PATENT DOCUMENTS

| 7,197,471 | B2 | 3/2007 | Cary et al. |
| 7,464,155 | B2 | 12/2008 | Mousavi et al. |
| 8,458,779 | B2 | 6/2013 | Valentine et al. |
| 8,972,400 | B1 | 3/2015 | Kapczynski et al. |
| 8,983,858 | B2 | 3/2015 | Evans et al. |
| 8,996,548 | B2 | 3/2015 | Garmon et al. |
| 9,015,171 | B2 | 4/2015 | Bayliss |
| 9,043,359 | B2 | 5/2015 | Bayliss |

(Continued)

OTHER PUBLICATIONS

Prasad, U. Devi et al., "Prediction of Churn Behavior of Bank Customers Using Data Mining Tools," Business Intelligence Journal, vol. 5, No. 1, pp. 96-101 (Jan. 2012).

*Primary Examiner* — Matthew J Ellis

(57) ABSTRACT

A system and method for the creation of household links (HHLs) associates each household with particular consumers associated with a consumer link (CL) and an address link (AL) in order to more accurately identify consumers who are part of the same household. The system and method utilizes a feedback loop system to maintain persistence of HHLs over time and more accurately resolve HHLs from information ingested from multiple files containing consumer information. Both point-in-time (PIT) and temporal data are used. Top-down and bottom-up clustering methods are applied to the data, and the best results are taken to generate the final association of HHLs with particular ALs and CLs. By more accurately identifying the households associated with particular consumer data, the invention significantly reduces the storage requirements and time required for processing very large consumer data sets, allowing, for example, processing of such data on standard desktop computers.

19 Claims, 13 Drawing Sheets

(56) References Cited

U.S. PATENT DOCUMENTS

| | | | |
|---|---|---|---|
| 9,087,346 B2 | 6/2015 | Hartzell et al. | |
| 2001/0056445 A1* | 12/2001 | Meystel | G06F 17/279 |
| | | | 715/234 |
| 2005/0278362 A1* | 12/2005 | Maren | G06F 16/90 |
| 2010/0205037 A1* | 8/2010 | Besehanic | G06Q 30/02 |
| | | | 705/7.34 |
| 2013/0006706 A1* | 1/2013 | Harvey | G06Q 10/0639 |
| | | | 705/7.29 |
| 2013/0210455 A1 | 8/2013 | Carlsson et al. | |
| 2014/0095320 A1 | 4/2014 | Sivaramakrishnan et al. | |
| 2014/0358926 A1 | 12/2014 | McGregor et al. | |
| 2014/0365484 A1* | 12/2014 | Freeman | H04W 4/21 |
| | | | 707/736 |
| 2014/0379424 A1* | 12/2014 | Shroff | G06Q 30/0204 |
| | | | 705/7.31 |
| 2014/0380348 A1 | 12/2014 | Shankar et al. | |
| 2016/0034305 A1* | 2/2016 | Shear | G06F 16/245 |
| | | | 707/722 |

* cited by examiner

| CL | AL | FirstName | LastName | Address | City | State | Zip | HHL |
|---|---|---|---|---|---|---|---|---|
| 123 | 100 | John | Doe | 123 Main St. | Little Rock | AR | 72201 | 10001 |
| 123 | 100 | John | Dough | 123 Main St. | Little Rock | AR | 72201 | 10001 |
| 123 | 200 | John | Doe | 234 Oak St. | Little Rock | AR |  | 10001 |
|  |  |  |  |  |  |  |  |  |
| 135 | 100 | Mary | Doe | 123 Main St. | Little Rock | AR | 72201 | 10001 |
| 135 | 100 | Mary | Dough | 123 Main St. | Little Rock | AR | 72201 | 10001 |
| 135 | 200 | Mary | Doe | 234 Oak St. | Little Rock | AR | 72206 | 10001 |
| 135 | 100 | Mary | Smith | 123 Main St. | Little Rock | AR | 72201 | 10001 |
| 135 | 300 | Mary | Doe | 897 Wall St. | Little Rock | AR | 72257 | 10001 |
|  |  |  |  |  |  |  |  |  |
| 148 | 500 | Rob | Smith | 301 Industrial | Conway | AR | 72034 | 10002 |

Fig. 2C

| CL | AL | Temporal Signals Created From Process | PIT Signals Created from Process | Prev Months HHL | CL | AL |
|---|---|---|---|---|---|---|
| 123 | 100 \| 200 | 45,38,26,24,19,12 #111000\|5,8,18,20,29,42 #000111 | 111110 \| 000111 | 10001 | 123 | 100 |
| 135 | 100 \| 200 \| 300 | 55,39,37,42,29,12 # 011110\|5,8,3,4,0,0 #1000000\|3,5,2,7,8,3 #000001 | 111100 \| 011111 \| 000000 | 10001 | 135 | 100 |
| 148 | 500 \| 200 | 35,32,21,34,29,12 #111110\|1,3,8,2,12,26 #000001 | 111111 \| 000001 | 10002 | 148 | 500 |
| 154 | 600 \| 500 \| 200 | 2,1,3,1,0,5 #0000000\|35,32,37,22,19,41 #111111\|1,3,2,2,1,3 #000000 | 000100 \| 11111 \| 000000 | 10002 | 154 | 500 |

Generate & Persist Household Groupings

| CL | AL | Group Number | Previous HHL |
|---|---|---|---|
| 123 | 100 | 100 | 10001 |
| 135 | 100 | 100 | 10001 |
|  |  |  |  |
| 148 | 500 | 101 | 10002 |
| 154 | 500 | 101 | 10002 |

| CL | AL | HHL | Best HH |
|---|---|---|---|
| 123 | 100 | 10001 | Y |
| 135 | 100 | 10001 | Y |
| 198 | 100 | 10005 | |
| 235 | 100 | 10008 | |
| 148 | 500 | 10002 | Y |
| 154 | 500 | 10002 | Y |

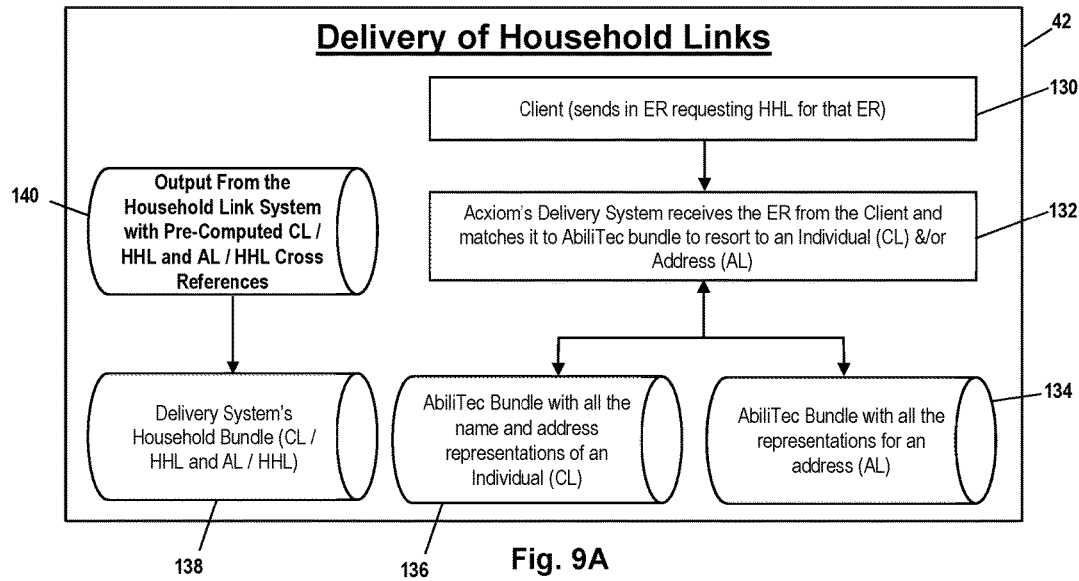

Fig. 9A

| Client Request | | | | | | | | |
|---|---|---|---|---|---|---|---|---|
| | FirstName | LastName | Address | City | State | Zip | | |
| | Elizabeth | Jones | 105 Albert St. | Conway | AR | 72032 | | |
| | Elizabeth | Jones | 301 industrial blvd. | Conway | AR | 72034 | | |
| | Elizabeth | Jones | 234 Oak St. | Little Rock | AR | 72206 | | |
| DS-API Match to CL | | | | | | | | |
| | FirstName | LastName | Address | City | State | Zip | CL | |
| | Elizabeth | Jones | 105 Albert St. | Conway | AR | 72032 | 154 | |
| | Elizabeth | Jones | 301 industrial blvd. | Conway | AR | 72034 | 154 | |
| | Elizabeth | Jones | 234 oak St. | Little Rock | AR | 72206 | 154 | |
| DS-API Match to HHL | | | | | | | | |
| | FirstName | LastName | Address | City | State | Zip | CL | HHL |
| | Elizabeth | Jones | 105 Albert St. | Conway | AR | 72032 | 154 | 10002 |
| | Elizabeth | Jones | 301 Industrial blvd. | Conway | AR | 72034 | 154 | 10002 |
| | Elizabeth | Jones | 234 Oak St. | Little Rock | AR | 72206 | 154 | 10002 |
| AbiliTec Bundle | | | | | | | | |
| | CL | AL | FirstName | LastName | Address | City | State | Zip |
| | 154 | 600 | Elizabeth | Jones | 105 Albert St. | Conway | AR | 72032 |
| | 154 | 500 | Liz | Jones | 301 Industrial blvd. | Conway | AR | 72034 |
| | 154 | 500 | Elizabeth | Jones | 301 Industrial blvd. | Conway | AR | 72034 |
| | 154 | 500 | Jones | Elizabeth | 301 Industrial blvd. | Conway | AR | 72034 |
| | 154 | 200 | Jones | Elizabeth | 234 Oak St. | Little Rock | AR | 72206 |
| Household Bundle | | | | | | | | |
| | CL | HHL | | | | | | |
| | 154 | 10002 | | | | | | |

Fig. 9B

| CL | AL | FirstName | LastName | Address | City | State | Zip | HHL | Industry Standard HHL |
|---|---|---|---|---|---|---|---|---|---|
| 123 | 100 | John | Doe | 123 Main St. | Little Rock | AR | 72201 | | 10001 |
| 135 | 100 | Mary | Doe | 123 Main St. | Little Rock | AR | 72201 | | 10001 |
| 123 | 100 | John | Dough | 123 Main St. | Little Rock | AR | 72201 | | 10003 |
| 135 | 100 | Mary | Dough | 123 Main St. | Little Rock | AR | 72201 | | 10003 |
| 123 | 200 | John | Doe | 234 Oak St. | Little Rock | AR | 72206 | 10001 | 10004 |
| 135 | 200 | Mary | Doe | 234 Oak St. | Little Rock | AR | 72206 | | 10004 |
| 135 | 100 | Mary | Smith | 123 Main St. | Little Rock | AR | 72201 | | 10005 |
| 135 | 300 | Mary | Doe | 897 Wall St. | Little Rock | AR | 72257 | | 10006 |
| 148 | 500 | Rob | Smith | 301 Industrial blvd. | Conway | AR | 72034 | | 10007 |
| 148 | 200 | Robert | Smith | 234 Oak St. | Little Rock | AR | 72206 | | 10008 |
| 154 | 600 | Elizabeth | Jones | 105 Albert St. | Conway | AR | 72032 | | 10009 |
| 154 | 500 | Liz | Jones | 301 Industrial blvd. | Conway | AR | 72034 | 10002 | 10002 |
| 154 | 500 | Elizabeth | Jones | 301 Industrial blvd. | Conway | AR | 72034 | | 10002 |
| 154 | 500 | Jones | Elizabeth | 301 Industrial blvd. | Conway | AR | 72034 | | 10010 |
| 154 | 200 | Jones | Elizabeth | 234 Oak St. | Little Rock | AR | 72206 | | 10011 |

Fig. 10B

| Household link system storage ||||||
|---|---|---|---|---|---|
| Subsystem / Input Sources | size | Subsystem / Input Sources | size | Space Savings ||
| | | hhlink hints files storage | 75 GB | |
| 6 months worth of Acxiom's internal metadata ( searching month by month ) | 6 TB | Intermediate temporary files (deleted automatically once the subsystem is created) | 25 GB | |
| Name Address extract from Acxiom's Knowledgebase | 2 TB | | | |
| Temporal Source File1 | 250 GB | | | |
| Point-in-time Source Files | 100 GB | | | |
| Temporal Confirmatory Source File | 1TB | | | |
| 5 months worth of files feeding Feedback Loop | 500 GB | | | |
| | | | | |
| Total Persisted Storage | ~10 TB | Total Persisted Storage | 75 GB | 10000.00% |

Fig. 11A

| System time to pull samples of 1000 cls / als / names / addresses ||||||
| --- | --- | --- | --- | --- |
| Subsystem / Input Sources | Time | Subsystem / Input Sources | Time | Time Savings |
| 6 months worth of Acxiom's internal metadata ( searching month by month ) | 120 min | hhlink hints (with all temporal / contextual evidence) | 3.6 min | |
| Name Address extract from Acxiom's Knowledgebase | 60 min | | | |
| Temporal Source File1 | 20 min | | | |
| Point-in-time Source Files | 10 min | | | |
| Temporal Confirmatory Source File | 45 min | | | |
| 5 months worth of files feeding Feedback Loop | 90 min | | | |
| | | | | |
| Total | ~6 hours | Total | 3.6 min | 10000.00% |

Fig. 11B

SYSTEM AND METHOD FOR IMPROVING COMPUTATIONAL EFFICIENCY OF CONSUMER DATABASES USING HOUSEHOLD LINKS

CROSS-REFERENCE TO RELATED APPLICATIONS

This application claims the benefit of provisional patent application No. 62/222,994, filed on Sep. 24, 2015. Such application is incorporated herein by reference in its entirety.

BACKGROUND

The field of the invention is relationship modeling between multiple types of entities, in particular household constituencies, for data services provided in a computational environment with a very large number of records that must be processed.

Consumer marketing efforts today are extending across multiple channels, including, for example, on-line advertising, text advertisements, telephone calls, digital television, and other targeted forms of advertising. These efforts are also expanding from a focus on a single individual to groups of individuals that share a common social/economic relationship. Several products now offer models of household constituency and attributes in order to facilitate household-based marketing. These products are based first on identifying individuals and their postal addresses from a variety of available representations and attribute information. Once this is done, both direct and indirect evidence of common relationships that culminate in the construction of a representative household must be gathered and interpreted. Household-based marketing offers the potential advantages of reduces cost of mailings. In addition, it may offer computational efficiencies if households are identified more accurately, since a smaller data set of households will result if more individuals are accurately categorized in a single household rather than inaccurately treated as separate entities.

The data to support householding efforts are gathered from consumer generated forms, such as surveys, as well as public data sources such as telephone directory information. Also, a variety of data is compiled from larger sets of such information generated by marketing and business sources for the direct intention of marketing services. This data is primarily compiled and interpreted in terms of single point-in-time (PIT) instances of records that contain personally identifiable information (PII), i.e., each included individual is represented by a single record intended to represent a single "here and now" snapshot of the individual's representation and attribute. Therefore, the recency of the information for such data sets is highly critical in order to determine accurate residence addresses and association data such as telephone numbers, current name used by the individual, and age. Unfortunately, in spite of all efforts, collections of such data continue to contain a significant amount of "stale" or incorrect information, and the identification of such records is an extremely difficult if not impossible task.

Compounding this difficulty to collect and validate trusted PII is the fact that there will always be transcription errors and compilation misinterpretations that create records that appear legitimate in isolation but creates significant ambiguity when aggregated with other PII records. Such errors can include digit mistyping or flipping in personal identification strings, dates, and names (which can actually change the perceived gender of the represented individual), as well as representations that are difficult to determine if the name representation string identifies a single individual or a pair of individuals.

In an attempt to mitigate the data problems just identified, some data services attempt to create a hierarchy of "trusted" sources from which quality decisions concerning individual PII records are made based on the ranking of the associated source. But the overall quality of a data source does not necessarily translate to the data quality of any single PII record, and it is not uncommon to create a set of PII records from a small set of highly trusted sources whose actual accuracy falls well below that of any one of the sources individually.

Individuals change their PII representations and attributes for a variety of reasons. This can happen due to marriages, divorces, moves, and changes in cellular telephone numbers. Similarly, individuals often create multiple "views" of themselves that they wish to be kept separate, such as using a name variant and a post office box address for all financial and legal business transactions and a different name and address for specific personal transactions. Hence ambiguity in sets of PII and associative data is not necessarily an indicator of any difference in the quality or recency of the corresponding PII records, further complicating householding efforts.

Moving from the identification of consumers and their most recent postal address to properties of representative households, individuals' moves from one location to another do not necessarily imply that the associated household has broken or become significantly different in terms of its attributes. Once representative households are identified and household links (unique identifiers) are assigned, these links must be carefully persisted (i.e., maintained) in these cases, as the assignments of new links primarily imply a significant change in the constituency of the entity. For example, the definition above requires a common residence for the individuals; however, a common change in the specific residence does not change the household. Similarly, a change in the name representation of an individual may or may not trigger a change in the associated household. Current house-holding methods perform poorly in these scenarios.

As changes in social and economic relationships that affect marketing decisions also affect the resulting real-world households, the accurate and timely identification of such changes are important for users of a household relationship product. These relationship changes are often difficult to identify from a single PIT PII framework. Hence, the inventors hereof have recognized that significant improvements in the state of the art require a rich framework that includes data and metadata not capable of being captured in traditional PIT data sources.

Acxiom's Entity Graph Resolution Repository (EGRR) is a non-discoverable repository that allows for resolution of entities, where each entity consists of a set of PII representations, attributes, and metadata. These entities are given a persisted and maintained identification link using Acxiom's proprietary linking technology. (This linking process is described in certain implementations in U.S. Pat. Nos. 6,523,041 and 6,766,327, which are incorporated by reference herein in their entirety.). For purposes of this invention the primary entities represent "consumers" and "addresses" (consumer link, i.e., CL, and address link, i.e., AL). The EGRR contains PII representations that can be interpreted from a temporal perspective that is not possible from localized PIT data. On access to a particular entity representation in the EGRR, its internal metadata captures and aggregates data over a long-term for a fixed time period. This aggregated data is used to infer possible changes in the behavior of the entities they represent. This method helps us get a historical view of possible entity representation changes that cannot be simulated with PIT data. In particular, the inventors hereof have recognized that this broad and anonymized coverage could be leveraged to construct representative households for every consumer link in the EGRR that directly addresses all of the issues noted earlier.

This aggregated metadata contains a time sequenced (temporal) set of entity representations for an individual that both enriches the PIT data context and can directly identify and validate changes in PII information at a very granular level. The EGRR offers a several such temporal views of each consumer relative to their identified PII and attribute data extending over many years. Finally, the sources that represent partial temporal PII information publish only the most recent changes in PII such as changes in address, and hence provide independent confirmatory information.

What is desired then is a system and method that leverages the vast data source represented by the EGRR or a similar data store in order to build and maintain effective representative households using both PIT and temporal data within a computationally efficient contextual framework.

BRIEF SUMMARY

This invention is a computationally efficient contextual framework to construct and maintain an effective, accurate, up-to-date representation of households constructed from a subsequently stored in the EGRR. The specific resources in one implementation includes a highly parallel computing environment such as implemented by a Hadoop cluster, and a carefully selected set of source files that address expected changes in individuals' PII representations (marriages, divorces, moves) and independent temporal knowledge for a significant number of consumers.

Within this framework, the invention creates a series of decision points necessary to create the resulting product. These decision points may include, in various implementations, the choice of the location for each consumer; the representative household for each consumer; the assignment of a household link to each resulting representative household; and the choice of a best representative household at an address.

The persistency of both the assigned household link and the best representative household is highly dependent on the persistency of the constituency of each of the constructed representative households at a given location. This latter persistency is highly dependent on the persistency of the choice of the most current and accurate address for each individual. Therefore, to achieve the final desired results, this invention in various implementations uses several techniques to control the persistency at each decision point as well as exploit the additional context created at each decision point to persist the accuracy at each subsequent decision point.

In order to preserve the persistency at each of the decision points, in one implementation a champion-challenger methodology is employed. This methodology computes the best possible choice that persists the previous decision independent of any contextual changes. For example, in the decision for the most accurate location for an individual, the champion would be the location that was assigned in the previous iteration. Then a challenger is constructed primarily based on the rich contextual framework from the different data sources. This challenger can be significantly different from the champion. The champion and challenger are then compared, with the challenger chosen over the champion only in case it is decisively better than the champion. Hence changes between two relatively equally valid choices are not allowed until the challenger offers sufficient evidence to force a change.

At each decision point, once the decision is made based on the above approach the invention in certain embodiments then double checks the decision via a feedback loop. This loop compares the new decision and all previous decision points over a previous number of builds, such as, for example, a sufficient time period, for the available data to identify and confirm any associated changes. If there is evidence in this temporal set of metadata that the newly computed results should be reevaluated, the decision is revisited in light of this new information. This type of a feedback loop is designed to identify cases where the previous results were due to an anomaly from the addition of the new source data that has now dissipated. However, the more accurate and persisted option may not be chosen in the champion challenger methodology without this additional context.

This invention is different and unique in that all of the decision points are tailored to an environment with a much richer and diverse framework that contains information that cannot be captured without a comprehensive historical view of the consumers and direct access to clients' linking usage patterns. Also, the decision making methodology is directly focused on identifying the most defensible answer, with available evidence, in the presence of ambiguity and inaccurate data. The resulting decisions correspond to behaviors of the actual individuals and households. Finally, the invention is not based on any specific single source or hidden ranking system of the sources in use, so source files can be added or removed without disrupting the overall behavior of the system.

It may be seen that the invention supports the growing diversity of marketing channels, efforts and reach, in that the specific boundaries for the invention are relationships between fundamental marketing-related entities, business process, technology, and maintenance of both the temporal construction of the specific relationships and the assigned links (relationship keys). The invention addresses both the capability of productionizing the creation of the representations of household constituencies as well as the subsequent customer support services for the product. For the first case the invention leverages the system's previously stated environment to construct a rich consolidated contextual framework for a comprehensive data store over a fixed time period.

The invention achieves great computational efficiency because it is implemented as a linearized, semi-structured data structure that compresses, in one example, over 10 terabytes of archived data into a mere 75 gigabytes that preserves the essence of the richness of the raw data yet achieves a tenfold decrease in the overall runtime. For the customer support component this resulting data representation offers a highly readable view of the contextual data constructed for each consumer representation. For this purpose, the data structure can reside on a laptop computer or single computer server to support these auxiliary needs, and the fundamental queries to fully identify the reasons for placing an individual into a specific household take only a few seconds.

Marketing efforts are now focusing more towards households instead of individuals, where households are defined by individuals who reside at a common location and share some common social/economic relationship. This invention provides a significantly improved description of the members of each household. Also each household is given a persisted link like those for other traditional entities i.e. consumers and addresses.

The invention recognizes that there are several aspects of constructed household relationships that must be preserved in order for optimal use in marketing services. In particular, in addition to the accuracy of each household representation at a single point in time, this invention addresses the additional need for maximum coverage in terms of consumer representations, temporal persistent household constituencies, and the maintenance of resulting links in an unambiguous and stable manner. This is achieved by custom techniques for the interpretation of a broad spectrum of each individual's PII and client usage history of the data store.

Overall, it may be understood from the foregoing that the invention, in various implementations, provides a rich contextual framework constructed by temporally based techniques and a diverse set of contextual data sources that offer PII and allows the invention to infer the best current address for individuals from the EGRR. This temporal based framework forms a data representation of all of the significant information in an efficient and easily interpretable linear construction that significantly reduces the computation time of the decision-making, and identifies and mitigates single instance, "here and now" anomalies in the representation and resolution data that can significantly lower the accuracy and recency of the decisions within the modeling system. The invention also results in an accurate assignment of the most recent location/postal address for each of the consumer links in the data store that is stable and defensible in the presence of multiple forms of ambiguity. Similar accuracy is possible for the case of multiple valid location candidates arising from diverse financial and business behaviors (owning multiple homes, personal and business accounts using different addresses, etc.). The invention further provides for the construction of representative households for each consumer in the data store that persist in spite of common moves and possible name changes. The invention provides for the assignment of household links for all consumer links in the data store, which offers clients optimal linkage coverage of their customer bases, and can be used in conjunction with the data store to identify associated households for a variety of input entity representations, such as name and phone number, partial name and partial address, and email address. The invention allows for the identification of a most representative household link for each address in the data store that has at least one consumer residing there. This designated link allows for the identification of a representative household for input consisting only of location information (e.g., postal address or latitude-longitude).

These and other features, objects, and advantages of the disclosed subject matter will become better understood from a consideration of the following detailed description and drawings.

BRIEF DESCRIPTION OF THE DRAWINGS

FIG. 2C is a process flow for a use case example using the household link system according to an implementation of the invention.

FIG. 9A is a high-level architectural flow diagram for how precomputed household links from the household link system according to an implementation of the invention are delivered to clients.

FIG. 9B shows a use case example for how precomputed household links from the household link system according to an implementation of the invention are delivered to clients.

FIG. 10B provides an example showing the benefits of using an implementation of the present invention.

FIG. 11A illustrates the hardware storage reduction impact resulting from using the household link system according to an implementation of the invention.

FIG. 11B illustrates a time-savings impact resulting from using the household link system according to an implementation of the invention.

DETAILED DESCRIPTION

Figure 1A:
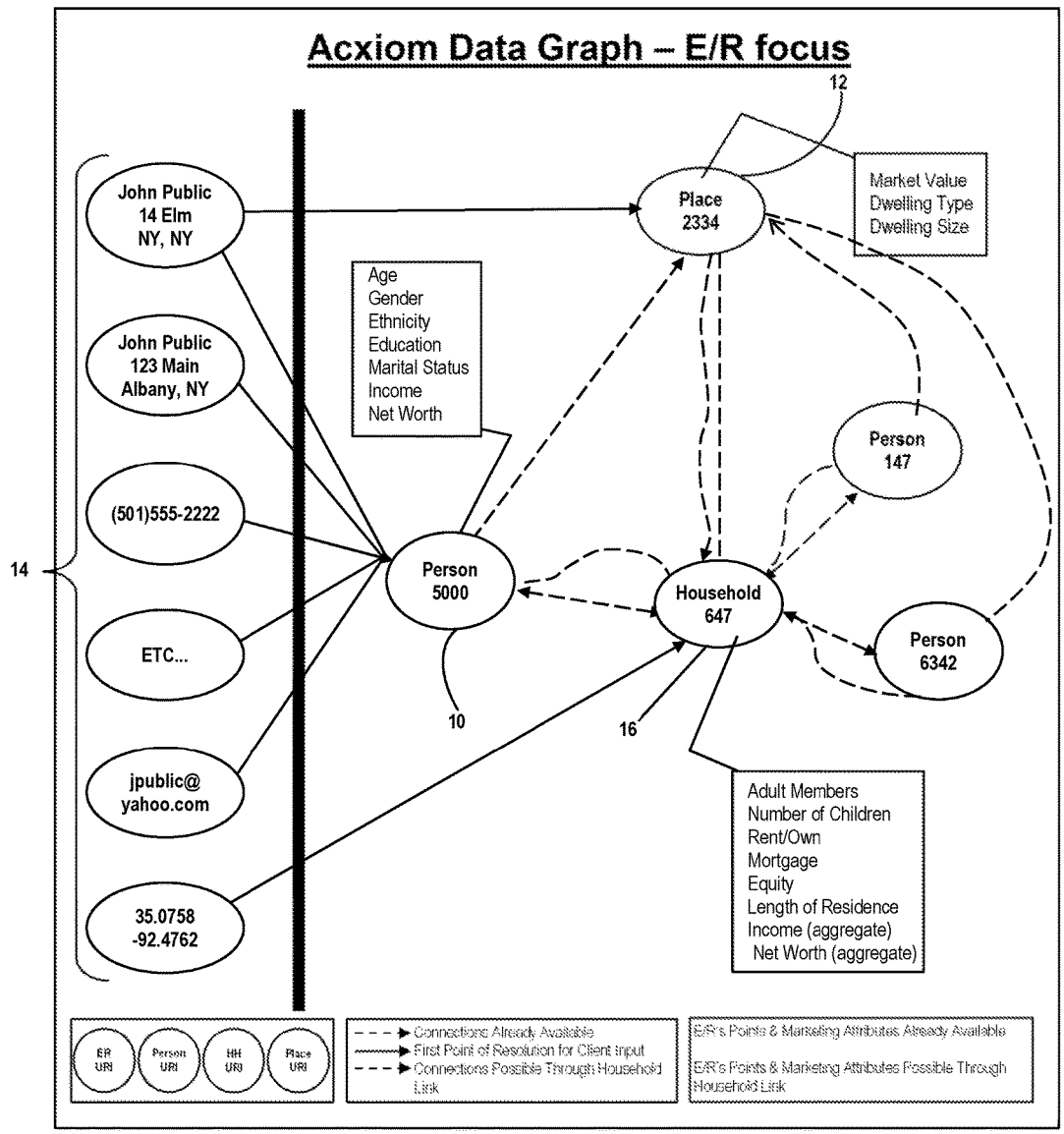
FIG. 1A is an overview of Acxiom's EGRR showing the addition of the household links to an existing provider data system according to an implementation of the invention.

FIG. 1A shows the ecosystem for entity resolution (ER) within a data environment and how household links according to an implementation of the invention fits in this ecosystem. Prior to the inclusion of household links, the data environment's ER focus was limited to recognizing a person/individual consumer link (CL) and a place/address link (AL). The environment would read in the entity representation information as presented by entity data 14, and resolve to a person 10 and a place 12. The entity representations from left, i.e., a name across two addresses, phone, and an email, could all resolve to a single person (associated with CL 5000 in the example). By contrast, a latitude/longitude or address could resolve only to a place 12 (associated with AL 2334 in the example). Each person would have its respective demographic data tied to it to help marketers segment and target its customers accordingly.

The inclusion of this invention, i.e., household link, affords significant improvements in the ER of households. The invention offers a dramatic improvement over the industry standard definition of a household, i.e., individuals who have the same last name and address. Also it offers more accurate representations of individuals in each household. In FIG. 1A, the household system helps identify the current residence for person/individual 12 (CL 5000), i.e., 14 Elm NY. In this case all the entity representations resolving to Person 10 will get a household link of 647. Also, the best household part of the household link system will perform a lat/long-to-household resolution as well. In this case, a lat/long of 35.0758-92.4762 resolves to place 12 that in turn will resolve the household link of 647. With household link, the provider is also able to aggregate individual level demographics to a household level to provide a demographic view pertaining to a household. This facilities accurate segmentation, targeting, and marketing to an advertiser's prospective customers.

Figure 2A:
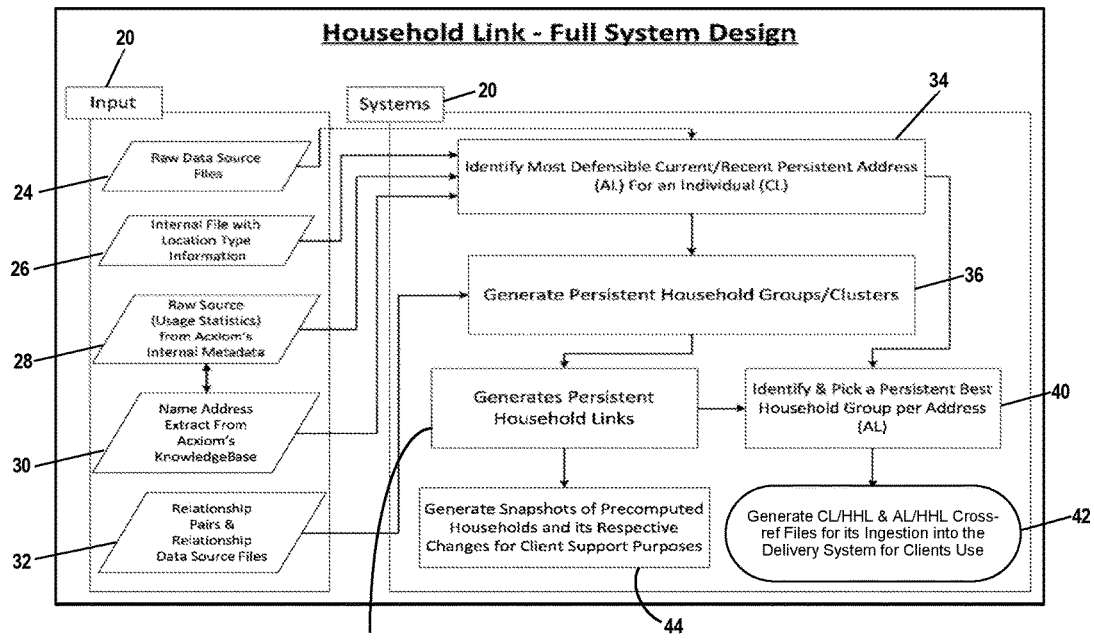
FIG. 2A is a high-level architectural view of the household link system according to an implementation of the invention.

Turning now to FIG. 2A, an overall of the household link system according to an implementation of the invention may be described. The household link system creates a persistent linkage of people to households and is built based on a history of Personal Identifiable Information (PII) available through a data store, such as Acxiom's EGRR. Such a data store contains not only current name and address data, but also maintains a history of names and addresses associated with an individual. Generally, the system can be divided into input 20 and systems 22. Input 20 can be subdivided into raw data source files 24, internal files with location-type information 26, raw source (usage statistics) from the provider's internal metadata 28, name address extracts from the provider's data store 30, and relationship pairs and relationship data source files 32. (These sources of data are more fully described below with reference to FIG. 3A.) Systems 22 contain hardware components and software routines to perform the various actions necessary to perform household linking using input 20. The household link system uses the complete address and name history for an individual from both the data store and any external data sources to perform the following steps at an Individual (CL) level:

i. The system picks a persistent best address (AL) using both temporal and point-in-time activity/date signals that are generated from a variety of types of data sources along with a feedback loop from the previous month's household groups. This step is performed by routine 34.

ii. The system at routine 36 generates the most defensible and persistent household groups at an address. The system groups sets of individuals (by CLs) via a dual approach clustering methodology built around a champion/challenger decision-making model to ensure persistency. This methodology attains a balance between preserving as much of the previous month's household structure as possible while making each individually constructed household structure defensible both in and of itself and in relationship to all other households formed at that same address AL.

iii. The system generates a persistent household link, at routine 38, for all the household groups at an address where any of the household groups have changed compared to the previous month. The system compares the previous month's household groups at an AL to its current month's groupings to categorize transactions that resulted in the change of groupings. Once it categorizes the transactions, it persistently assigns same/different household link to those respective new groups.

iv. The system identifies and picks a persistent best household group for each AL at routine 40. Whenever the system finds more than one household group associated with an address, it identifies and picks the best household group that could be represented with that address to facilitate an address or lat/long-to-household matching. The system is able to identify the household group by using the date and activity signals along with a feedback loop from the previous month's best household group.

v. The system generates a file for delivery system at routine 42. Once the system computes the household groups, links, and best household, it then generates a cross-reference file that is consumed by the provider's delivery system through which clients leverage the household groups produced by the household link system. The file consumed by the delivery system contains a household link association to an individual (CL) and household link association to an address (AL).

vi. The system generates a file to be used for client support at routine 44. Once the system computes the household groups, links, and best household, it then generates a combined file with all the information of new groups, new links, and its respective changes compared to the previous month. This file is used by a support team for client support purposes.

Figure 2B:
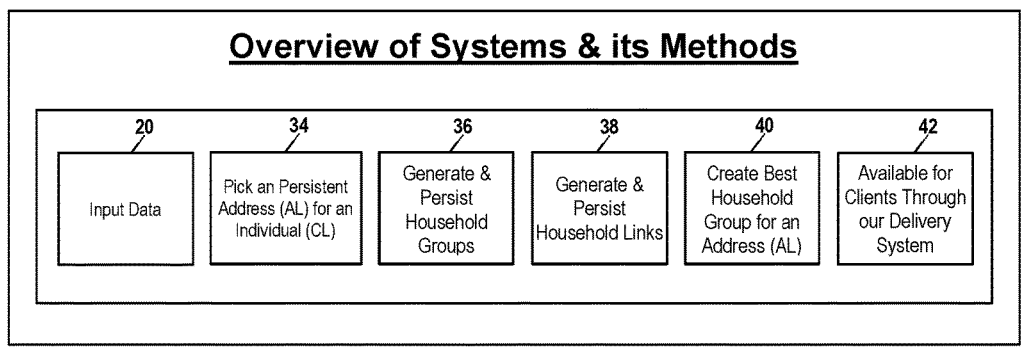
FIG. 2B is a view of the household link system according to an implementation of the invention with its respective subsystems and methods.

FIG. 2B is a simplified version of FIG. 2A. It shows in a more streamlined way how the household link system flows from taking input data sources 20 to picking an address for an CL at routine 34, to generating household groups and links at routines 36 and 38, respectively, to picking a best household for an AL at routine 40, to providing client delivery at routine 42. All throughout the process, it may be noted that the system is maintaining the persistency of picked AL, persistency of household groups, persistency of assigning household links, and persistency of picking best households.

FIG. 2C provides in a chart form an illustration of how the household link system functions. As already noted, a CL represents an individual or person and an AL represents an address. The multiple name and address variations like in this example come in from the various input data sources. The system takes those variations as inputs and runs them through the data store to assign an individual identifier consumer link (CL) and address identifier address link (AL), as shown. The system picks the persistent and most defensible recent representation of an address for a CL, i.e., AL 100 for CLs 123 and 135, and AL 500 for CLs 148 and CL 154, as shown in FIG. 2C. Once the system identifies the appropriate ALs, it then passes these CLs along with all the available name variations (multiple variations in this example) and other attributes to pick persistent household groups at that AL, e.g., household 1 with CL 123 and 135, and household 2 with CL 148 and 154. Once the household groups are identified, the system then generates persistent household links to be associated with each of the household groups at respective ALs, e.g., household link 10001 for household 1 and household link 10002 for household 2. Finally, the system then identifies the best household at each of these ALs before writing out a cross-reference file with CLs, ALs, household links, and the identified best household for each AL to be ingested by the provider's delivery system. This example is used throughout the document to explain each of the parts of the household link system in detail.

Figure 3A:
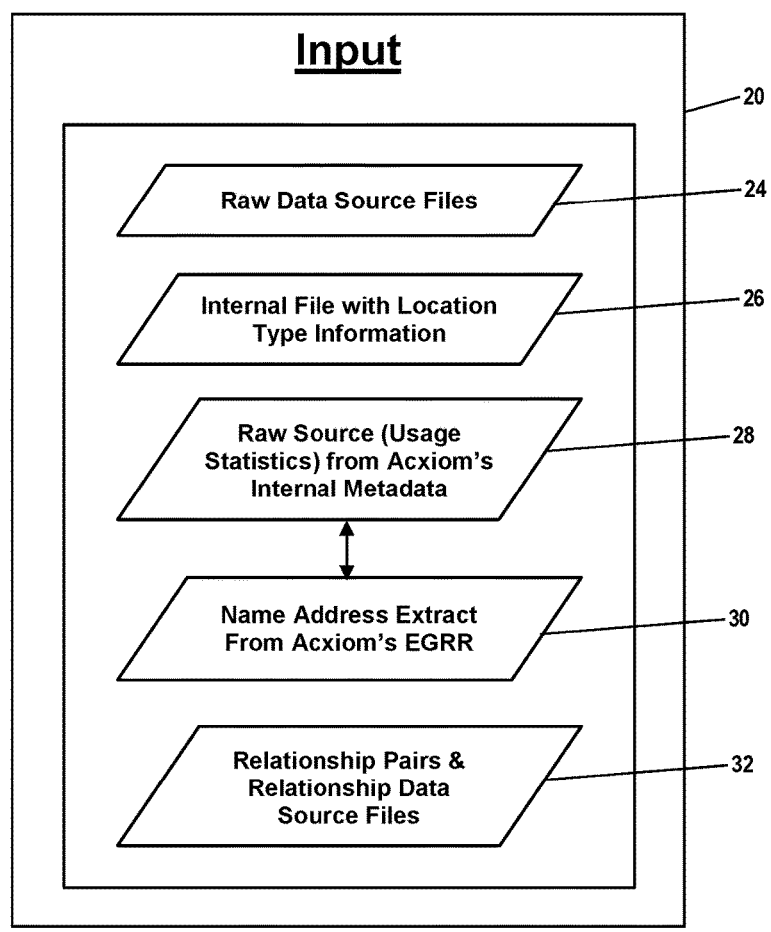
FIG. 3A is a detailed description of input streams feeding into the household link system according to an implementation of the invention.

FIG. 3A breaks out the input streams feeding in to the household link system. There are, in this example implementation, a set of raw data sources 24 that encompass the previously noted different types of point-in-time and temporal information. These sources, along with the data coming from provider's internal metadata 28 and its data store 30, are categorized as either point-in-time and temporal. There are raw data sources 24 that provide recent transactions and are categorized as point-in-time, whereas the other raw data sources that provide the historical snapshot, along with the provider's data store data 30, are categorized as temporal. Every source that provides a historical view of its database has rules to roll off the old data and add new transactions since the time it was last updated; for example, a source that provides all of the address history for an individual might publish up to nine addresses for that individual. Thus, whenever it gets a tenth address, it rolls off the last address and adds the new one, ensuring that at any given point it ends up publishing only up to nine addresses per individual. This kind of data is categorized above as data that provides a historical snapshot. The household link system consumes such files for a sufficient time period, for the available data to identify and confirm any associated changes. The household link system combines this rich temporal data with point-in-time data for an extended year, e.g., new movers and property tax and deeds data.

The relationship pairs 32 are generated through tracking people's moves across time, i.e., more than one individual moving together across multiple addresses and through one external raw data source that provides existing relationships through marriage. The relationship pairs and files feed into the household link system as one of the attributes to help form persistent household groups at an AL, whereas the other sources feed into the system for identifying the recent/current and most defensible persistent AL for a CL.

Figures 4A, 4B:
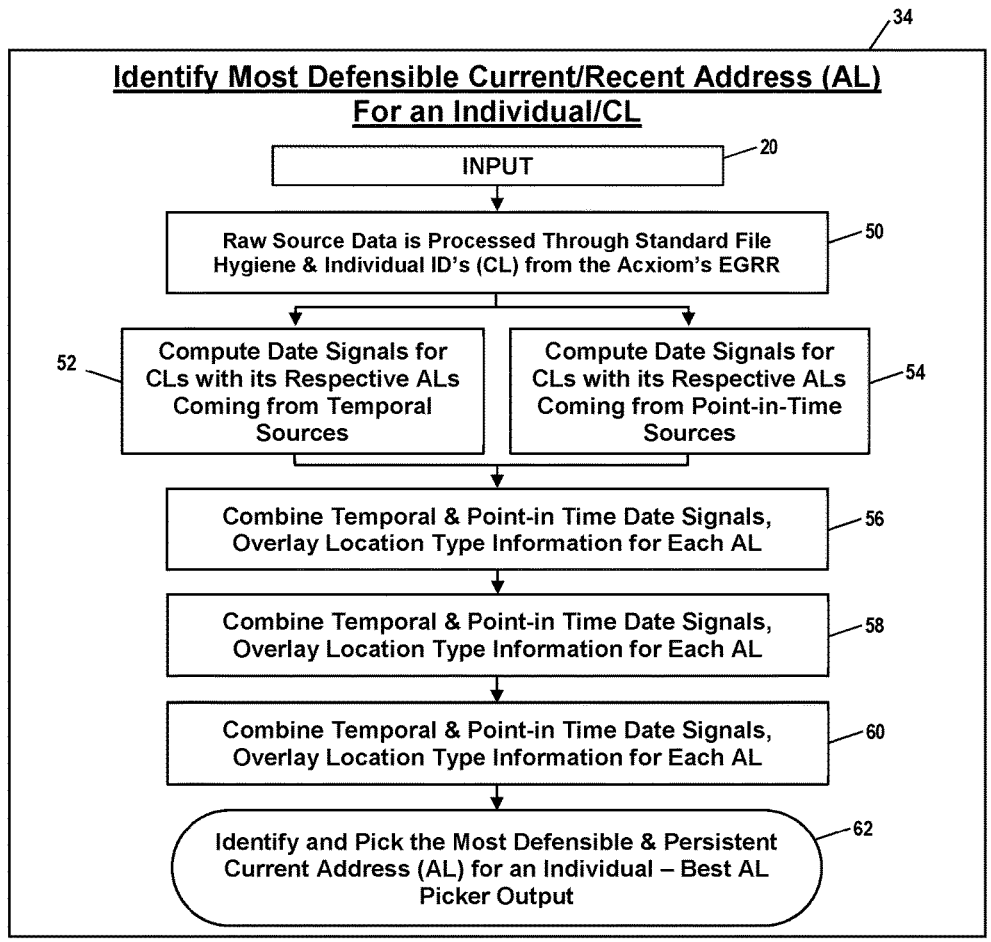
FIG. 4A is a detailed architectural flow of the household link subsystem according to an implementation of the invention that identifies the most defensible current and persistent address for an individual.
FIG. 4B is a use case example for the household link system according to an implementation of the invention that identifies the most defensible current and persistent address for an individual.

FIG. 4A shows in more detail the processing at identify most defensible current/recent persistent address (AL) for an individual (CL) routine 34. As mentioned throughout the document, the first step of the household link system is to identify and pick a most defensible persistent current/recent address for an individual. This is considered as one of the subsystems (routines) of the overall system that generates household links for an individual and address. All the raw source data is first sent through the provider's standard file hygiene (which "dedupes" the data, i.e., removes duplicate listings, and standardizes data fields, i.e., makes corrections such as consistent abbreviations for street, road, and the like) and is then matched to the data store to append a CL and an AL to each record at step 50. During this process an individual (CL) and an address (AL) is identified using the provider's ER techniques. Once the files are passed through the hygiene and matching, the AL picker subsystem categorizes each of the data sources into two broad categories based on the type and value of data they contribute: temporal data and point-in-time data.

As discussed above in reference to FIG. 3A, raw data sources that provide a historical snapshot along with the provider's internal metadata and data store are categorized as temporal. Subsystem 52 considers all the history for an individual coming in from these sources for a fixed time period. Once it categorizes the data, it then aggregates all data associated with a CL across time and constructs a temporal date signal pattern for all of the addresses where an individual has been seen for a recent fixed time period.

Also as discussed above in reference to FIG. 3A, raw data sources provide transactions for only a given period of time and are categorized as point-in-time sources. Subsystem 54 considers a years' worth of transaction history for an individual coming in from these data sources. The subsystem then aggregates all the available address data from these sources at a CL level. This is done to construct a date signal pattern for all the addresses where an individual has had some activity during the last year.

Once these point-in-time and temporal date signals are constructed, those are then combined at subsystem 56, aggregated at a CL level at subsystem 58, and then joined against the previous month's household link output (i.e., a feedback loop) at subsystem 60 to overlay the household link and the size of the respective household. The feedback loop helps maintain household persistence and also account for delayed moves (e.g., if the subsystem does not receive a move signal for one person in a household, it waits a sufficient recent time period for the external data to be captured and processed before breaking the household instead of breaking it at one month and possibly reforming the household in the next). The resulting linearized semi-structured file from the temporal and PIT date signals and the feedback loop is termed as a "best AL picker hints file" and is output by subsystem 62.

As just discussed with reference to FIG. 4A, the subsystem constructs a file with the date and activity signals from sources categorized as PIT and temporal. An example of the final hints file with date and activity signal created by the subsystem is represented in FIG. 4B. For CL 123, the data sources provide two ALs of 100 and 200, with both providing PIT and temporal signals for each AL. Also, the feedback loop provides the information that, in the previous month, CL 123 and 135 were in a common two-person household group. From the signals and the feedback loop, the subsystem identifies that AL 100 is much stronger, and it is also maintaining persistence with CL 135. Based on this evidence, the subsystem picks an AL 100 rather than 200. The final output from the subsystem will look like the data on the right side in FIG. 4B, i.e., a CL/AL cross-reference table. Once the subsystem compiles the above hints/evidence file with all the history for an individual, it then uses the date signal patterns and evidence to pick/identify the persistent and most defensible best address for an individual (i.e., where the evidence suggests the individual currently lives).

Figure 5A:
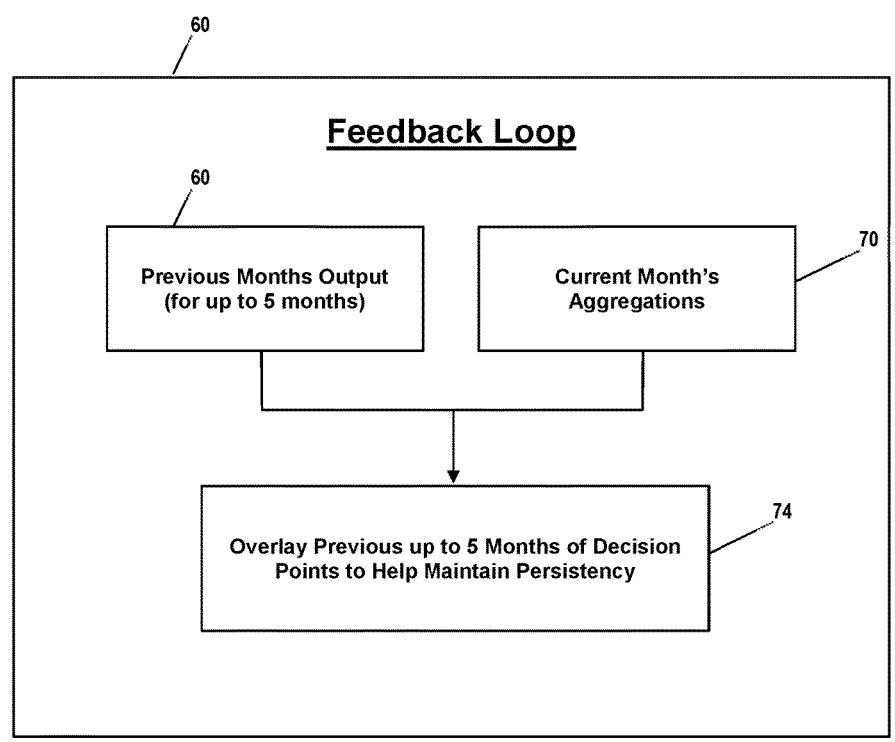
FIG. 5A is a flow diagram showing how persistence is maintained in all of the subsystems of the household link system according to an implementation of the invention through a feedback loop.

A feedback loop methodology is used multiple times throughout the household link system, such as in subsystem 60 in FIG. 4A. The main benefit derived from this methodology is persistence of the final resulting household groups and links. A feedback loop, as shown in more detail in FIG. 5A, compares the new decision from the current month's process at block 70 to the final decision points from up to a sufficient time period, for the available data to identify and confirm any associated changes from block 72 to generate the result at block 74. The feedback loop of FIG. 5A is a core part of the champion-challenger model that is used multiple times by the household link system. The feedback loop helps identify cases where the results formed may be due to an anomaly in the newly added source data, thereby signaling the need of more additional context in order to break the preserved persistence from the previous month.

Figures 6A, 6B, 6C:
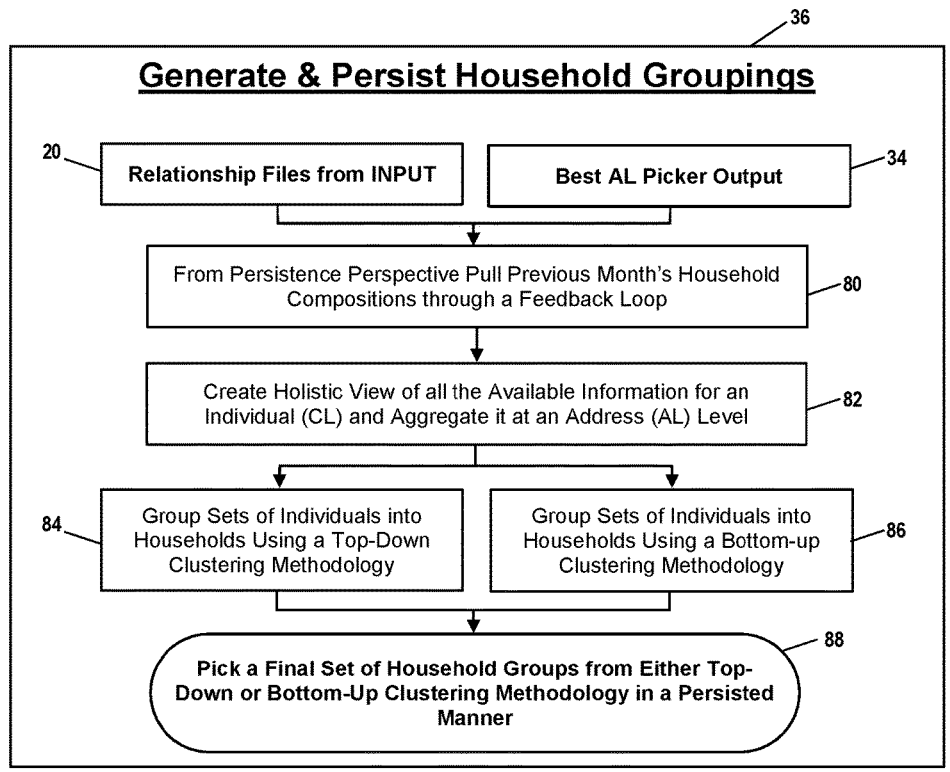
FIG. 6A is a detailed architectural flow diagram for the household link subsystem according to an implementation of the invention that generates persistent household groupings.
FIG. 6B is a use case example for the household link subsystem according to an implementation of the invention that generates persistent household groupings.
FIG. 6C shows an example output from the household link subsystem according to an implementation of the invention that generates persistent household groupings.

Turning to FIG. 6A, routine 36 from FIG. 2A may be described in more detail. The fundamental step of the household link system is the grouping (clustering) of sets of individuals (CLs) into respective households at their corresponding identified current addresses (ALs). Since the desired marketing efforts are aligned to target households rather than only individuals within a household, it is critical that the household formed as a part of this subsystem are most defensible and persistent. To ensure that high quality household groups are formed, the subsystem first compiles all the available attribute information for an individual and the address into a tree structured record. In order to generate these records, the subsystem reads in the output from the best AL picker subsystem 34 along with the relationship files from input 20 and passes them through a preprocessing step 80. As a part of this preprocessing step, the best AL picker output is joined with available sources (including the provider's data store) to pull all the available name variations and other attributes like gender, year of birth, record create date, and source provider counts for the chosen CL/AL combination. In parallel, the system collects a temporal/historical signal of previous common ALs across CLs from the provider's data store and also ingests source files for the identification of marriages and divorces, for example. The resulting identified pairs of individuals that share these very strong relationship attributes constitute a set of relationship pairs.

Once the preprocessing is complete, the subsystem aggregates all the CLs at the AL along with its corresponding attributes compiled during preprocessing at step 82. The data created during this process contains a rich holistic view of all the CLs across each AL. This attribute data will be used by the subsystem to measure the "strength" of the associated CLs to defensibly "attract" other CLs at the same AL into a relationship with them as some combinations have very sparse or questionable associative data that can give the impression of stronger relationships. There can be multiple households at a common AL. Therefore the subsystem ensures that the households formed are persistent from month to month and are inferred from the collected attributes and temporal relationships.

Once the subsystem has the attribute and temporal relationship data, it starts with its process of grouping CLs into a household. To ensure high quality persistent and most defensible groups are formed, the subsystem uses a dual clustering methodology of top-down and bottom-up clustering based around a champion-challenger model, at steps 84 and 86, respectively. The "champion" is a default set of households for each AL that makes no changes to the household groups from the previous month's decisions, i.e., it is the previous month's household groupings along with additional single-person households resulting from new individuals that are provided on the current month's files. On the other hand, the "challenger" is a newly formed set of households resulting from the clustering methodology performed on the current month's data. As a part of the champion-challenger model the system does not pick a household group resulting from a challenger unless there is significant evidence that suggests that the challenger forms a better household group than the champion. The champion-challenger model helps preserve persistency of the household groups. Although there are many clustering methodologies already in use, most use some form of a Euclidean metric to be the primary guide. Others do not take advantage of the embedded relationships of a rich cognitively contextual framework, nor do they preserve local persistence in the presence of small changes in the data set.

The subsystem uses a contextually richer clustering methodology where the decision points directly use the existing data and temporal context. This methodology has a dual approach that contains an inherent feedback loop/validation process so that the final decision is made with the full richness of the collected evidence and preserves the persistence of the constructed households over time. This approach uses a "champion/challenger" model of decision making to address the persistency issue. As noted above, the "champion" is a default set of households for each AL that makes the fewest possible changes to the households from the previous month's decisions. There are two possible "challenger" sets of households that can compete with this champion. The "top-down" clustering methodology at step 84 (described below) is driven by the observation that small changes in the set of CLs for an address primarily causes only small changes in the resulting households; however, over multiple months, a sequence of small changes could have a cumulative dramatic impact on the make-up of the households. Similarly, large changes in the set of CLs for an AL can drastically affect the resulting households. Therefore, to address these changes and the resulting household groups, the subsystem uses a "bottom-up" clustering methodology at step 86. The bottom-up methodology handles the case of a large number of changes in the CL set for the address, as well as checking the overall impact of a sequence of top-down assessments. Described below is a sequence of processes that a system executes to group people into their respective households.

First, a champion set is created. An initial champion set of households for each AL is created by removing all the CLs that did not appear from the previous month, and creating new individual households for each CL that did not appear in the previous month.

Next, top-down clustering is performed. The subsystem does not pass all the records through this methodology; rather, only those AL's where the number of CLs that differ from the previous month's set is no more than two are passed through. This particular clustering methodology only attempts to handle a single month's small changes and make minimal adjustments to this created champion that are supported by the previously constructed attribute data. No major reconstruction of households is allowed.

Next (or simultaneously), bottom-up clustering is performed. Also here, the subsystem does not pass all the records through this methodology, rather only those ALs where the number of CLs that differ from the previous month's set is more than two are passed through. This methodology ignores the construction of the previous month's households and constructs the households exclusively from the context of the available attributes and relationship data. This allows for major changes in the makeup of the resulting households from the previous set that are supported by the temporal and relational data.

Finally, blending is performed at step 88. As noted above, a major expectation of the constructed households is that changes should not occur frequently within an address. To make the final decision of the makeup of the households while honoring this persistency expectation, each constructed challenger set of households is compared to the champion set. The champion is chosen over a challenger unless the challenger outperforms the champion relative to a set of quality metrics that describe fundamental attributes of any strongly defensible set of households for the associated AL. For example, if there are multiple CLs that have strong evidence that they represent the same individual, a defensible set of households should have every one of these CLs contained in the same household. Similarly, if two or more CLs that appear to represent different individuals appear to share a common last name, those CLs again would be expected to belong to a common household, especially if the AL represents a single family dwelling or a specific multi-family dwelling unit. The chosen set of households is the output of the blender and is passed on to the post-processing step of assigning a household link in a persisted manner.

As discussed in the description for FIG. 6A, the first part of the grouping/clustering subsystem is to create a holistic view of all the available information for an individual (CL) at an address (AL). An example of an AL with a holistic view of data attributes and temporal relationships of all the respective CLs associated with it is represented in FIG. 6B. For AL 100, there are two CLs 123 and 135. There are other attributes like the household composition and household links from previous months along with the household composition, and AL stability and size of the household for a sufficient time period, for the available data to identify and confirm any associated changes. These attributes mainly contribute towards maintaining persistency of a household group. The other attributes like name variations, its temporal and point-in-time signals from the best AL picker, gender formations, year of births, and counts of number of sources confirming the information, are used to determine the current state of household formation. Taking the prior month's and current month's information into consideration along with the temporal relationship pairs, the households are computed and persisted by means of the above mentioned subsystem. The resulting output is a set of households for each AL for the current month.

Once the file with a holistic view as shown in FIG. 6B is formed, the subsystem forms the household groupings for the current month. Once the subsystem completes the household formations at an AL, the final output will look like the table of FIG. 6C. The file will contain the CL, AL, group number representing the current household formation, along with the previous month's household link (HHL) as a hint to the link assignment subsystem to ensure links assigned are persistent with the previous month.

Figures 7A, 7B:
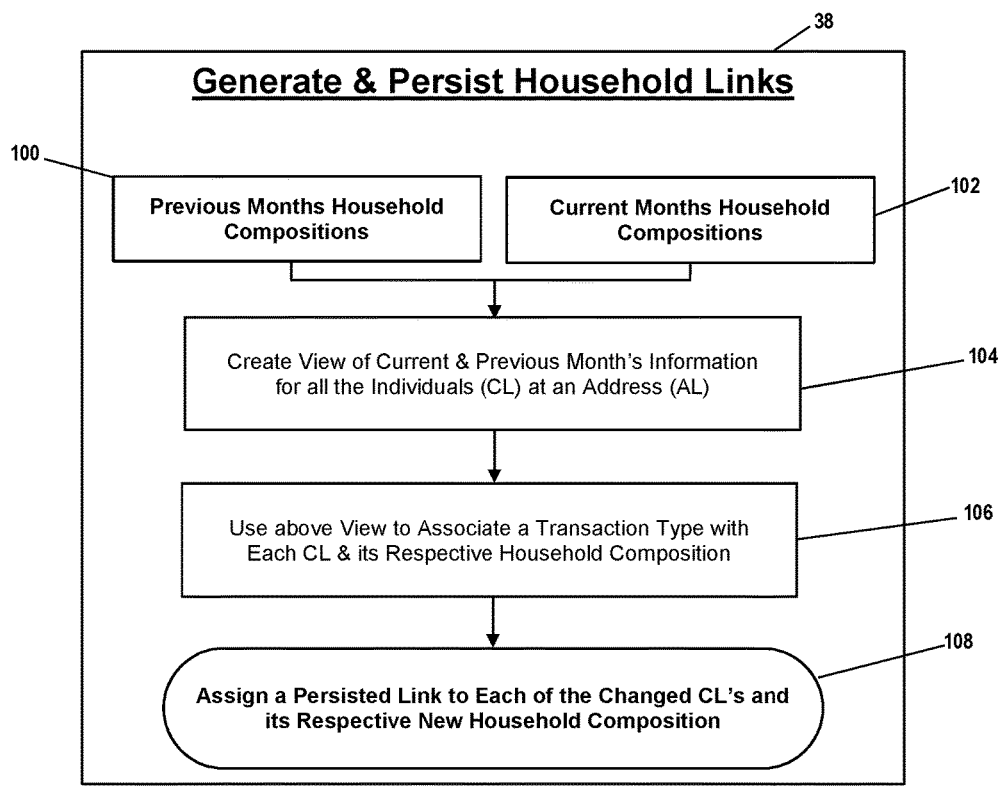
FIG. 7A is a detailed architectural flow diagram for the household link subsystem according to an implementation of the invention that generates persistent household links.
FIG. 7B is a use case example for the household link subsystem according to an implementation of the invention that generates persistent household links.

The steps involved in the routine for generating and persisting household links 38 are shown in more detail in FIG. 7A. A core component of the system is the control of the persistency of links to the household groups throughout the life cycle. As a part of this subsystem, the information from the current month's household formations 102 are compared to the ones from previous month's household formations 100, to identify any changes at step 104 and their respective transaction types at step 106. As mentioned above, the subsystem also takes into consideration the persistency of a household link by itself and the amount of change that will be reported at step 108. For example, if everyone from a household move from address "A" to address "B", the system keeps the same household link in spite of a change in address. The transactions involved in this process at step 106 are "new adds," "consolidations," "splits," and "no change," each of which are explained more fully below.

New adds are the representations for individuals (CLs) that were not a part of the previous month's output but were seen for the first time on source files in the current month. New adds could fall into two categories. In one case, new adds for an existing household, an individual's representation (CL) came into the system for the first time, but it was grouped together with an existing household. An example of this circumstance is a child who reaches the age of majority and starts showing up at an existing household belonging to his or her parents. In a second case, new adds for a new household, an individual's representation (CL) came in to the system for the first time and was grouped by itself in a new household, i.e., a new household identifier was generated to group the individual.

A consolidation occurs when all the individuals from one household move into and get grouped with another existing household. A simple example for this scenario could be when a couple gets married and one spouse moves in with the other spouse.

A split occurs when one or more individuals move from one household to another existing or new household. A simple example for this scenario could be a couple becoming separated or divorced and moving into separate households. A split could fall in to two categories, full or partial household split. In a full split, all of the individuals (CLs) from one household split to more than one household. For example, each member of a divorced couple moves into the households of their respective new partners. In a partial split, some of the, but not all, individuals (CLs) from one household split to one or more than one other existing or new household. For example, one of the two divorced spouses move out of their existing house, but the other spouse stays in the same house.

To maintain persistency, the subsystem identifies and categorizes all the ALs where there were no changes in the formation of the household groups as no change". Also, when a complete household moves from one address to another without joining or separating from or with another household, these household are identified and categorized as no change" as well to maintain persistency of a household.

Once the changes are identified and categorized into their respective transactions, the subsystem then assigns the persistent links accordingly at step 108. After the initial grouping process, a final household link/identifier (HHL) must be assigned. If all records in the household have only one HHL across the group, that household identifier is maintained going forward; all the records that are categorized as "no change" fall into this category. However, in cases where a group contains records with more than one HHL resulting from a split, consolidation, or new add to the household, the following criteria are used to maintain link persistence. For an individual who remains at an address (i.e., stays at the same address as last month), the system keeps the HHL and that HHL is overlaid across the other new individuals in that household. In the case of an even split of an existing household with all records split across two or more existing households, the split records will inherit an HHL from the new household they join. In the case of an even split of an existing household where all records split into two or more new households, one of those group(s) keeps the HHL and the other group(s) are assigned a new HHL.

As just discussed with reference to FIG. 7A, the first part of the subsystem that generates persistent household links is to capture the information from the current month's household formations and compare to the ones from the previous month's household formations. These comparisons are performed to identify any changes and the respective transaction types. An example for the file with assigned transaction types is shown in the table of FIG. 7B. In the current month, the formation of the households at AL 100 is the same as the one in the previous month, i.e., HHL of 10001 for CL 123 and CL 135. Since there was no difference in the household formations, the subsystem categorizes these with a transaction type of "no change." Once these transaction types are identified and categorized, the second part of the subsystem interprets these transaction types and assigns a persistent household link. The example for an output from this subsystem looks like the one on the right portion of the table of FIG. 7B. Since the HHL for CLs 135 and 123 in the previous month was 10001, and the transaction types are NCH ("no change"), the subsystem overlays the HHL from the previous month, i.e., 10001. This helps in keeping HHLs persistent over the lifecycle of the household groups.

Figures 8A, 8B:
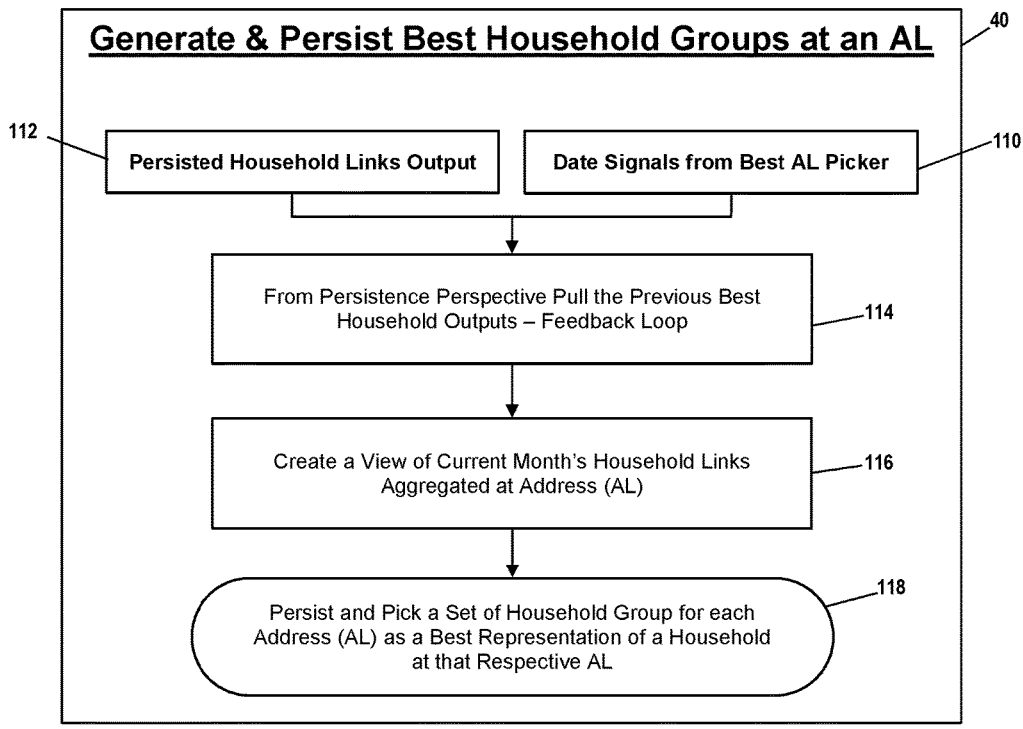
FIG. 8A is a detailed architectural flow diagram for the household link subsystem according to an implementation of the invention that associates a persistent best household group for an address.
FIG. 8B shows an example output from the household link subsystem according to an implementation of the invention that generates persistent household groups along with a final output from the whole household link system.

FIG. 8A shows the architectural flow for routine 40 in more detail, by which a persistent best household group is associated with an address link (AL), from all the processing the household link system performs, i.e., from picking an persistent best AL for an individual, to grouping them into persistent households, to assigning those groups a persistent household link. This can resolve to one address (AL) ending up with multiple household groups based on the ALs picked for each individual and the supporting attribute and relationship data considered to form household groups. Whenever the system finds more than one household group associated with an address, it tries to identify and pick the best household group that could be represented with that address to facilitate an address or lat/long to household matching. The system is able to identify the household group by using the date and activity signals along with a feedback loop from the previous month's best household group. A best household is the one that the system identifies as the group that currently resides at that address. Like all the other subsystems, this subsystem also ensures that these household groups are persistent and not switching between one household to another and back to the original household. FIG. 8A outlines the flow of this subsystem. This subsystem starts out by reading in the output from its preceding process, i.e., output from the subsystem that generates persistent household links, at step 112. The subsystem also pulls the file with date signals from the best AL picker at step 110. At step 114 the subsystem then runs a feedback loop to pull the best household information for a sufficient recent time period for the external data to be captured and processed to ensure the picked household groups are persistent as well. Once the subsystem has all the information from the input streams and the feedback loop, it aggregates all the information at an address (AL) level at step 116. The final step of this subsystem is to use the champion-challenger model to identify and pick a persistent best household group for an AL at step 118.

An example output from the process shown in FIG. 8A is given in the table of FIG. 8B. As discussed in the description for FIG. 8A, whenever there is more than one household link associated with an address (AL), the household link system identifies and flags one household group that currently resides at that address. In the above example, AL 100 ends up with more than one household link, i.e., 10001, 10005 and 10008. In this case the household link system uses the date signals from the best AL picker and the previous best household links from the feedback loop, for that respective address, to identify one strong household link that should be associated with that particular address (AL). In this case it identified and flagged household link 10001 as the best household for an AL 100. In this case of a client requesting a household for a lat/long (without any other PII) associated with AL 100, then the system would return 10001 as the household for that lat/long. Household links 10005 & 10008 will be returned only if a client sends PII that would match to CLs 198 and 235, respectively. Also, AL 500 does not have any other household link except for 10002 so in this case that household is automatically flagged as the best household for that AL to enable lat/long matching. This will also be the final output that is sent to be ingested into the provider's delivery system for its delivery to clients.

FIG. 9A shows in more detail the processing of routine 42 to deliver household links from the provider to a client. The cross-reference file from the household link system as shown in FIG. 8B is used in conjunction with matching logic (such as the AbiliTec customer data integration technology from Acxiom Corporation) to retrieve a unique identifier (CL) for a wide range of entity representations. Once the cross reference file is delivered to the provider's delivery system, it creates a household bundle that connects to the consumer bundle on CL and to the address bundle on AL (only for the household links that have been identified as the best household for the associated AL). A client sends in an entity representation at step 130 requesting the household link (HHL) associated with that particular entity representation. Once the provider's delivery system receives the entity representation at step 132, it matches it to a bundle to resolve to an individual (CL) at step 136 and an address (AL) at step 134. If the delivery system finds the CL match on the bundle, it returns the HHL associated with that CL at step 138. But if the delivery system cannot find a match to a CL, then it resorts to an address match, i.e., it returns the HHL flagged as the best household at that respective address. At step 140, the output is then generated to the client, which consists of the pre-computed CL/HHL and AL/HHL cross references.

The table of FIG. 9B provides example output from the household link system. As noted above, the final output file from the household link system is used to create a household bundle in the provider's delivery system. In the above example, a client requests household links for Elizabeth Jones at three different addresses. The first step performed by the delivery system is to use matching logic to resolve to an individual customer link (CL) for each of the three entity representations. It then takes that CL to match against the household bundle to pull the associated household link for that CL and return it back to the client. In the above example, all three entity representations for Elizabeth Jones resolved to one CL, i.e., 154, and the household bundle matched to HHL 10002 for that CL of 154. Therefore, all three entity representations for Elizabeth Jones ended up with one CL and HHL.

Figure 10A:
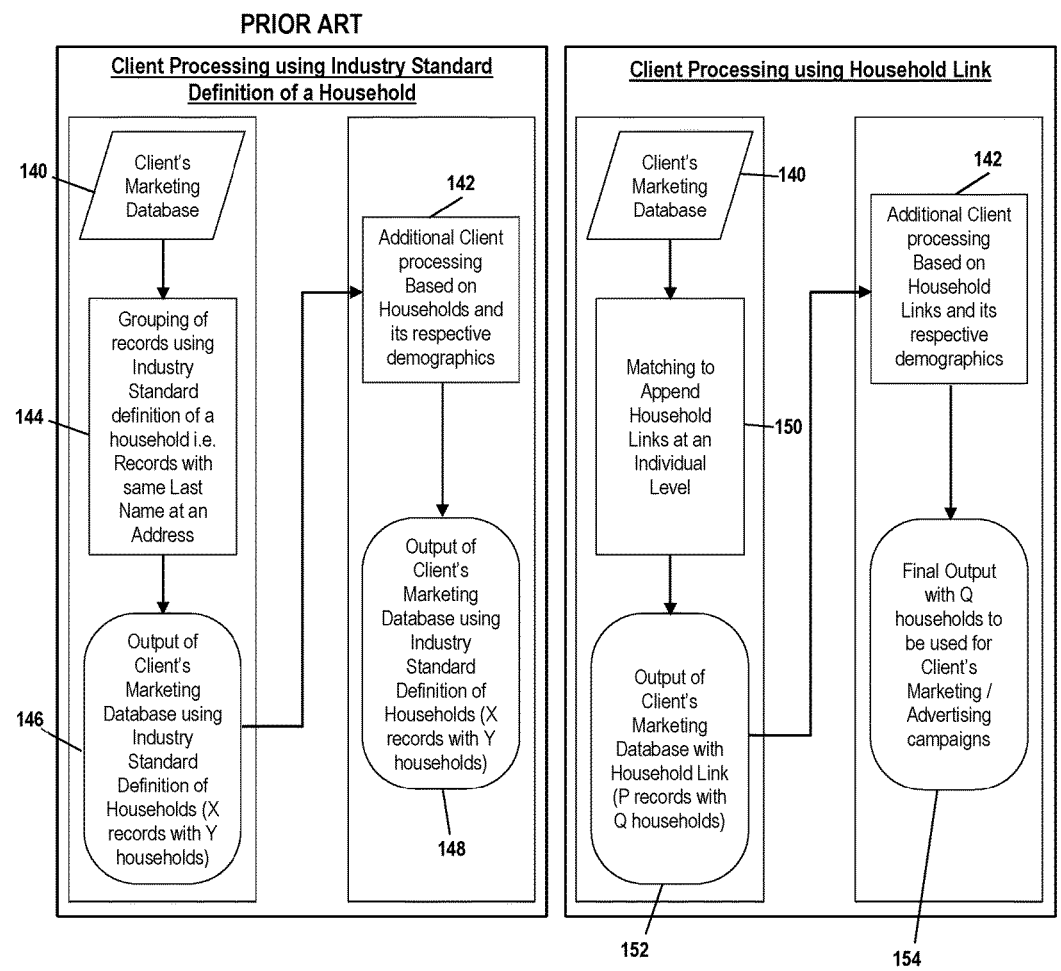
FIG. 10A is a high-level architectural flow diagram showing computational benefits from using precomputed household links from the household link system according to an implementation of the invention.

FIG. 10A provides a comparison of the process for a client to make use of the household link system, comparing the results from the prior art methods on the left side of FIG. 10A to the results using an implementation of the present invention on the right side of FIG. 10A. A client's marketing database file 140 is usually passed through the grouping logic at step 144 to append households, resulting in the output file at step 146, and then interpretation of its household level demographics as additional processing at step 142 before using the final file 148 for its marketing campaign. If a client's marketing database file is processed through an implementation of the present invention, with matching at step 150 to result in output file 152, then additional client processing at step 142 to result in final output file 154, the total records on the resulting file will be significantly fewer than that of the ones appended using the industry standard definition (i.e., individuals with the same last name at an address). Relating these percentages to the flowchart, the "P" records in file 152 resulting from step 150 will be less than "X" records in file 146, thereby decreasing both CPU processing cycles and bandwidth consumption for the client's further processing of interpreting households and its respective demographics for its potential advertising campaign. Also, the final output from this processing at file 154 will be significantly less than the other prior art method at file 148 (i.e., "Q" households are fewer than "Y" households thereby reducing the final footprint of the client marketing database). By using this implementation of the present invention, clients may see reduced advertising expenditures and more revenue and responses due to an increased understanding of the household constituency. Although actual results will vary based on the quality of the client marketing database prior to the use of the household linking according to an implementation of the present invention, existing evidence suggests the improvements described above will be commonly realized by most clients.

For a typical client marketing database, the present invention allows for fewer records to be considered for further processing, storage, and transfer, which results in reduced storage requirements, CPU processing cycles, and bandwidth consumption overall. The present invention creates a persistent linkage of people to households. Once delivered to clients, HHLs can be used as a part of the client's master data management database to help it better identify, segment, target, and market to its prospective customers. While facilitating the mentioned attributes, it also reduces costs through reduced non-duplicated mailing for the client's marketing campaigns. The HHL provides high value to the provider's clients, including increased focus, accuracy, and savings on the client's marketing spend. The invention's focus on accuracy, recency, and temporal stability provides a rich, single point-of-view of a household through the provider's industry unique capability of providing entity information irrespective of the submitted PII using the invention.

The table of FIG. 10B provides an example showing the benefits of using an implementation of the present invention as described herein. In the example discussed above with reference to FIG. 10A, by using the industry standard definition of a household (i.e., all individuals with same last name at an address), clients would categorize the fifteen records shown in FIG. 10B into eleven different households. However, using the described implementation of the present invention, the fifteen records will be grouped into just two households (i.e., one of John & Mary Doe, where Mary's maiden name was Smith, and another of Rob Smith and Elizabeth Jones, with different variations of their names). This result not only helps clients to better identify and segment households and to save money through reduced mailings (i.e., two mail pieces vs. eleven mail pieces), but also helps clients to better target a household by accurately identifying and separating single-person households vs married, multi-person households.

The table of FIG. 11A shows the impact on hardware storage for an example set of data using an implementation of the present invention compared to the prior art method. The system creates the temporal contextual framework for the sequence of decisions from the raw sources as the initial step in under three hours. These raw sources reside as data marts on the Hadoop cluster and serves a wide variety of company use cases.

The final representative household results are appended to the HHL hints file that contains all of the aggregated evidence used by all the previously noted decision point subsystems as part of the system (FIG. 6B is an example for household link hints). The small resulting footprint offers two significant advantages. First, these hint files can be stored for a long period of time which gives a complete historical view of the decisions and output. This is critical for both customer support and for maintenance and improvements to the system and method. Second, the size of any one month's information can be stored on local computer systems/hardware. This allows for the separation of the hardware requirements for the company's production environment from the customer support environment, without loss of contextual information.

The table of FIG. 11B shows the impact on computation time for an example data set of data using an implementation of the present invention compared to the prior art method. For customer support and the maintenance and improvements to the system and methods, specific entity representations will be given with the goal of both identifying what the final decisions were and the context that was used to make each decision. The table of FIG. 11B identifies the difference between using the raw source files in this effort and using the HHL hint files when one thousand queries are made together (which is more efficient than querying one at a time). The search time will grow exponentially as more components are included in the query entity representation. In order to alleviate this rapid growth, this data has been constructed into a delimited yet variable length linear data structure in order to use a parallel search with ten processes each running on a separate processor of a multi-processor system to find the entire context for the decisions for entity representations that include the consumer link, address link, full name, and full address. If the search is done sequentially relative to each raw source the total time needed to find all of the data is roughly six hours on average. Even if the search is done both in parallel across the sources and within them, the average time drops only to about two hours, compared to 3.6 minutes using an embodiment of the present invention as described herein.

The present invention has been described with reference to the foregoing specific implementations. These implementations are intended to be exemplary only, and not limiting to the full scope of the present invention. Many variations and modifications are possible in view of the above teachings. The invention is limited only as set forth in the appended claims. All references cited herein are hereby incorporated by reference to the extent not inconsistent with the disclosure herein. Unless explicitly stated otherwise, flows depicted herein do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. Any disclosure of a range is intended to include a disclosure of all ranges within that range and all individual values within that range.

The invention claimed is:

1. A computerized method for generating household links for a consumer database, comprising the steps of:
   a. receiving a plurality of input files comprising temporal consumer data sources and point-in-time consumer data sources;
   b. utilizing both the temporal consumer data sources and the point-in-time consumer data sources, identifying a current or recent persistent address link (AL) for an individual associated with a consumer link (CL);
   c. generating a group of persistent households associated with the individuals associated with the ALs and individuals associated with the CLs;
   d. generating persistent household links (HHLs) for each of the persistent households, wherein generating HHLs for each of the persistent households comprises the steps of:

i. aggregating all known information for each CL at an AL level;
ii. grouping sets of consumers into households using both a top-down clustering methodology and a bottom-up clustering methodology, wherein the top-down clustering methodology comprises the step of passing through only those ALs where the number of CLs differ from a previous champion set by no more than two to create a top-down challenger set of households for each AL, thereby allowinq for only minor chanqes in the makeup of resulting households from the previous champion set, and wherein the bottom-up clustering methodology comprises the step of passinq throuqh only those ALs where the number of CLs differ from the previous champion set by more than two to create a bottom-up challenger set of households for each AL, thereby allowing for major changes in the makeup of the resulting households from the previous champion set;
iii. generating an initial champion set of households for each AL by removing all the CLs that did not appear in the previous champion set;
iv. creating new individual households for each CL that did not appear in the previous champion set;
b. identifying a persistent best household for each AL; and
c. generating a cross-reference file for output to a client comprising one or more of CL/HHL and AL/HHL cross references for at least a subset of the CLs and HLs associated with the plurality of input data files.

2. The method of claim 1, wherein the step of identifying a current or recent AL for an individual associated with a CL comprises the step of pulling at least one previous months' household composition for each CL through a feedback loop.

3. The method of claim 2, wherein the step of generating HHLs for each of the persistent households further comprises the step of pulling at least one previous month's household compositions through a feedback loop.

4. The method of claim 3, wherein the step of generating HHLs for each of the persistent households further comprises the step of picking a final set of household groups each comprising a pick from either of the top-down or bottom-up clustering methodologies.

5. The method of claim 1, further comprising the steps of:
d. receiving from a client server a plurality of entity representations (ERs) requesting an HHL for each ER;
e. matching the ER to one or both of a customer data bundle comprising all representations for an AL or a CL;
f. creating an updated customer data bundle comprising one or both of matched HHLs and ALs or HHLs and CLs; and
g. outputting to the client server the cross-reference file.

6. A method of identifying a best household group for an address, comprising the steps of:
h. receiving at a processor a set of input data comprising consumer records, each record associated with a consumer link (CL) uniquely and persistently identifying a particular consumer;
i. picking a unique and persistent address link (AL) for each individual consumer link (CL);
j. generating a persistent set of household groups, wherein each AL is associated with a household group;
k. generating a set of household links (HHLs), wherein each HHL is unique and persistent with respect to a particular one of the set of household groups, wherein the step of generating a set of HHLs comprises the step of grouping sets of consumers into households using a top-down clustering methodology by passing through only those ALs where the number of CLs differ from a previous champion set by no more than two to create a top-down challenger set of households for each AL, and using a bottom-up clustering methodology by passinq throuqh only those ALs where the number of CLs differ from the previous champion set by more than two to create a bottom-up challenger set of households for each AL;
l. using the HHLs, creating a best household group for each of the ALs and associating the best household group with each AL; and
m. creating an output file comprising an association of ALs with HHLs.

7. The method of claim 6, wherein the step of picking a unique and persistent AL for each individual CL comprises the step of pulling at least one previous months' household composition for each CL through a feedback loop.

8. The method of claim 7, wherein the step of generating a set of HHLs comprises the step of pulling at least one previous month's household com positions through a feedback loop.

9. The method of claim 8, wherein the step of creating a best household group for each of the ALs and associating the best household group with each AL further comprises the step of aggregating all known information for each CL at an AL level.

10. The method of claim 9, wherein the step of generating a set of HHLs further comprises the step of generating an initial champion set of households for each AL by removing all the CLs that did not appear in the previous champion set, and creating new individual households for each CL that did not appear in the previous champion set.

11. The method of claim 10, wherein the step of creating a best household group for each of the ALs and associating the best household group with each AL further comprises the step of picking a final set of household groups each comprising a pick from either of the top-down or bottom-up clustering methodologies.

12. The method of claim 11, wherein the step of picking from either of the top-down or bottom-up clustering methodologies comprises the step of selecting the top-down challenger set or the bottom-up challenger set over the initial champion set for each household if the challenger set outperforms the initial champion set relative to a set of quality metrics.

13. A system for creating household links, comprising:
n. a data store, comprising a plurality of input sources each comprising consumer data;
o. a persistent address routine that, when called upon, for each of a plurality of consumer links (CLs), each of which are associated with data pertaining to a particular consumer from the data store, identifies a most defensible current or recent persistent address link (AL) for such CL;
p. a household group routine that utilizes at least the data store and the most defensible current or recent persistent AL for each CL to generate a persistent and unique household group for each AL;
q. a household link (HHL) routine that utilizes the persistent and unique household group for each AL to generate a set of HHLs, wherein each HHL is persistent and unique from all other HHLs, wherein the HHL routine comprises a top-down clustering subroutine to groups sets of consumers into households using a top-down clustering methodology by passinq throuqh only those ALs where the number of CLs differ from a previous month's set by no more than two to create a top-down challenger set of households for each AL, thereby allowing for only minor changes in the makeup of resulting households from the previous month's set, and a bottom-up clustering subroutine to group sets of consumers into households using a bottom-up clustering methodology by passinq throuqh only those ALs where the number of CLs differ from the previous month's set by more than two to create a bottom-up challenger set of households for each AL, thereby allowinq for major chanqes in the makeup of the resultinq households from the previous month's set;

r. a best household per AL routine that utilizes the persistent household group for each AL and the set of HHLs to assign a best household group and associated HHL to each AL; and s. a cross-reference routine that utilizes the HHL and AL pairings to generate one or both of a CL/HHL and AL/HHL cross-reference file.

14. The system of claim 13, wherein the household group routine further pulls at least one previous months' household composition for each CL through a feedback loop.

15. The system of claim 14, wherein the HHL routine further pulls at least one previous month's household compositions through a feedback loop.

16. The system of claim 15, wherein the HHL routine further aggregates all known information for each CL at an AL level.

17. The system of claim 15, wherein the HHL routine further comprises a champion set generation subroutine to generate an initial champion set of households for each AL by removing all the CLs that did not appear from the previous month, and creating new individual households for each CL that did not appear in the previous month.

18. The system of claim 17, wherein the HHL routine further picks a final set of households groups each comprising a pick from either of the top-down or bottom-up clustering subroutines.

19. The system of claim 18, wherein the cross-reference routine further receives from a client server a plurality of entity representations (ERs) requesting an HHL for each ER, matches the ER to one or both of a customer data bundle comprising all representations for an AL or a CL, creates an updated customer data bundle comprising one or both of matched HHLs and ALs or HHLs and CLs; and outputs to the client server the cross-reference file.

* * * * *